(12) United States Patent
Schattner et al.

(10) Patent No.: US 10,901,143 B1
(45) Date of Patent: Jan. 26, 2021

(54) LIGHT PIPE CRUSH RIB ATTACHMENT

(71) Applicant: SIGNIFY HOLDING B.V., Eindhoven (NL)

(72) Inventors: David Schattner, Newnan, GA (US); Kyle Proctor, Decatur, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/529,549

(22) Filed: Aug. 1, 2019

(51) Int. Cl.
*G02B 6/00* (2006.01)
*F21V 8/00* (2006.01)
*B21D 22/04* (2006.01)

(52) U.S. Cl.
CPC ........... *G02B 6/0096* (2013.01); *B21D 22/04* (2013.01); *G02B 6/0028* (2013.01); *G02B 6/0038* (2013.01)

(58) Field of Classification Search
CPC .. G02B 6/0093; G02B 6/0095; G02B 6/0096; G02B 6/02; G02B 6/0028; G02B 6/0038; B21D 22/01
See application file for complete search history.

(56) References Cited

U.S. PATENT DOCUMENTS

| | | | |
|---|---|---|---|
| 5,481,440 A | 1/1996 | Oldham et al. | |
| 6,795,461 B1 * | 9/2004 | Blair | G02B 6/4292 372/101 |
| 9,975,675 B1 * | 5/2018 | Kuo | F21V 33/0024 |
| 2014/0304944 A1 | 10/2014 | Carr et al. | |

* cited by examiner

*Primary Examiner* — Y M. Quach Lee

(57) ABSTRACT

A light pipe assembly includes a light pipe having one or more first crush ribs extending outwardly from an outer surface of the light pipe. The light pipe assembly further includes a light pipe housing having one or more second crush ribs extending into a cavity of the light pipe housing. When the light pipe is positioned in the cavity of the light pipe housing, the light pipe is retained in the light pipe housing by the one or more first crush ribs and the one or more second crush ribs. The one or more first crush ribs come in contact with and press against the one or more second crush ribs when the light pipe is positioned in the cavity of the light pipe housing.

19 Claims, 15 Drawing Sheets

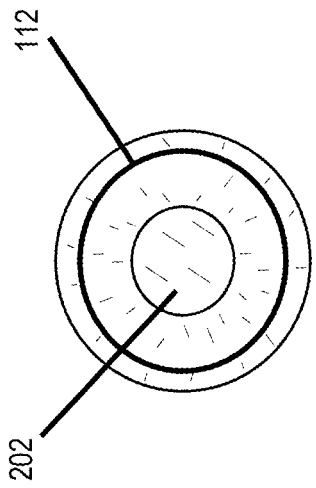
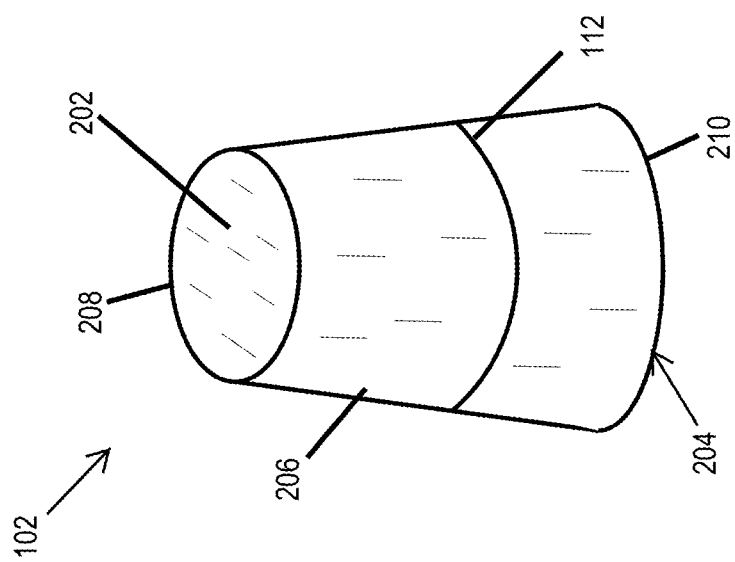

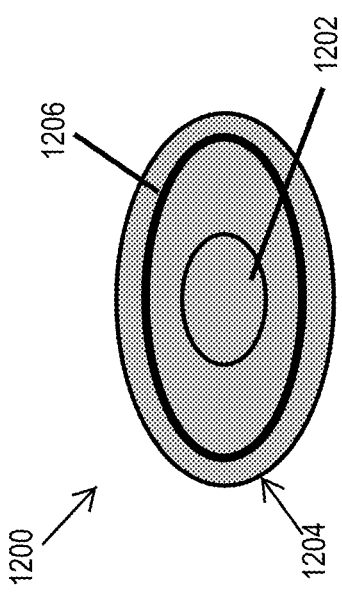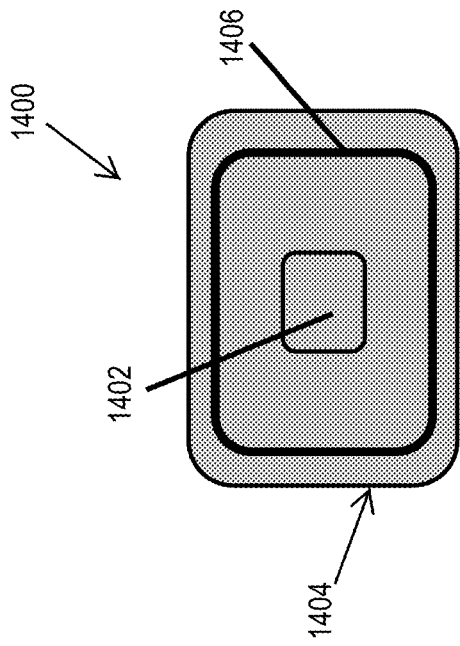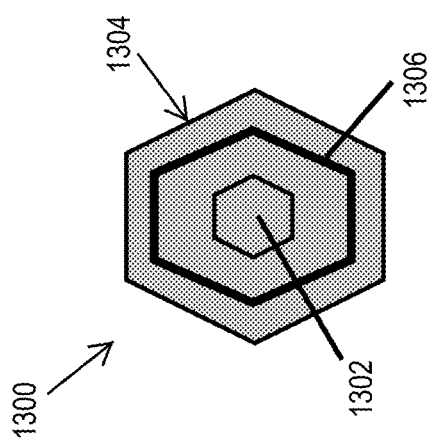

US 10,901,143 B1

LIGHT PIPE CRUSH RIB ATTACHMENT

TECHNICAL FIELD

The present disclosure relates generally to light pipes, and more particularly to attachment of light pipes.

BACKGROUND

Light pipes may be used to receive light and to transmit light. For example, light may enter a light pipe at one end and exit the light pipe at an opposite end toward a photosensor. As another example, light that is emitted by a light source (e.g., a light emitting diode) may enter a light pipe at one end and exit the light pipe at an opposite end, for example, as an indicator light. A light pipe may be made from a transparent material, such as a polycarbonate, and may rely on total internal reflection principles to retain the light in the light pipe as the light travels from one end of the light pipe to an opposite end of the light pipe. A light pipe is typically retained in a desired position, for example, in a housing using an adhesive, a screw, a snap fit, etc. In some cases, these methods may result in reduced efficiency of light transmission through the light pipe and/or may require increased size, additional structure, and increased cost. Further, light pipes with particular shapes such as a truncated cone shape (i.e., a shape of a frustum of a cone) may be challenging to retain in place using typical attachment means. Thus, light pipe attachment solutions that allow for efficient transmission of light through light pipes may be desirable.

SUMMARY

The present disclosure relates generally to light pipes, and more particularly to attachment of light pipes. In an example embodiment, a light pipe assembly includes a light pipe having one or more first crush ribs extending outwardly from an outer surface of the light pipe. The light pipe assembly further includes a light pipe housing having one or more second crush ribs extending into a cavity of the light pipe housing. When the light pipe is positioned in the cavity of the light pipe housing, the light pipe is retained in the light pipe housing by the one or more first crush ribs and the one or more second crush ribs. The one or more first crush ribs come in contact with and press against the one or more second crush ribs when the light pipe is positioned in the cavity of the light pipe housing.

In another example embodiment, a light sensor device includes a photosensor circuit and a light pipe assembly. The light pipe assembly includes a light pipe having one or more first crush ribs extending outwardly from an outer surface of the light pipe. The light pipe assembly further includes a light pipe housing having one or more second crush ribs. The light pipe is positioned in a cavity of the light pipe housing such that the one or more first crush ribs are in contact with and press against the one or more second crush ribs. A narrow surface of the light pipe is proximal to the photosensor circuit such that a light that exits the light pipe through the narrow surface is directed toward the photosensor circuit.

In another example embodiment, a lighting fixture includes a light source to provide an illumination light and a light sensor device that includes a photosensor circuit and a light pipe assembly. The light source is controlled based on a light detection by the light sensor device. The light pipe assembly includes a light pipe having one or more first crush ribs extending outwardly from an outer surface of the light pipe. The light pipe assembly further includes a light pipe housing having one or more second crush ribs. The light pipe is positioned in a cavity of the light pipe housing such that the one or more first crush ribs are in contact with and press against the one or more second crush ribs. A narrow surface of the light pipe is proximal to the photosensor circuit such that a light that exits the light pipe through the narrow surface is directed toward the photosensor circuit.

These and other aspects, objects, features, and embodiments will be apparent from the following description and the claims.

BRIEF DESCRIPTION OF THE FIGURES

Reference will now be made to the accompanying drawings, which are not necessarily drawn to scale, and wherein:

FIG. 2A illustrates a top perspective view of the light pipe shown in FIG. 1 according to an example embodiment;

FIG. 2B illustrates a top view of the light pipe shown in FIG. 1 according to an example embodiment;

FIG. 12 illustrates a top view of a light pipe according to another example embodiment;

FIG. 13 illustrates a top view of a light pipe according to another example embodiment;

FIG. 14 illustrates a top view of a light pipe according to another example embodiment;

Figure 1:
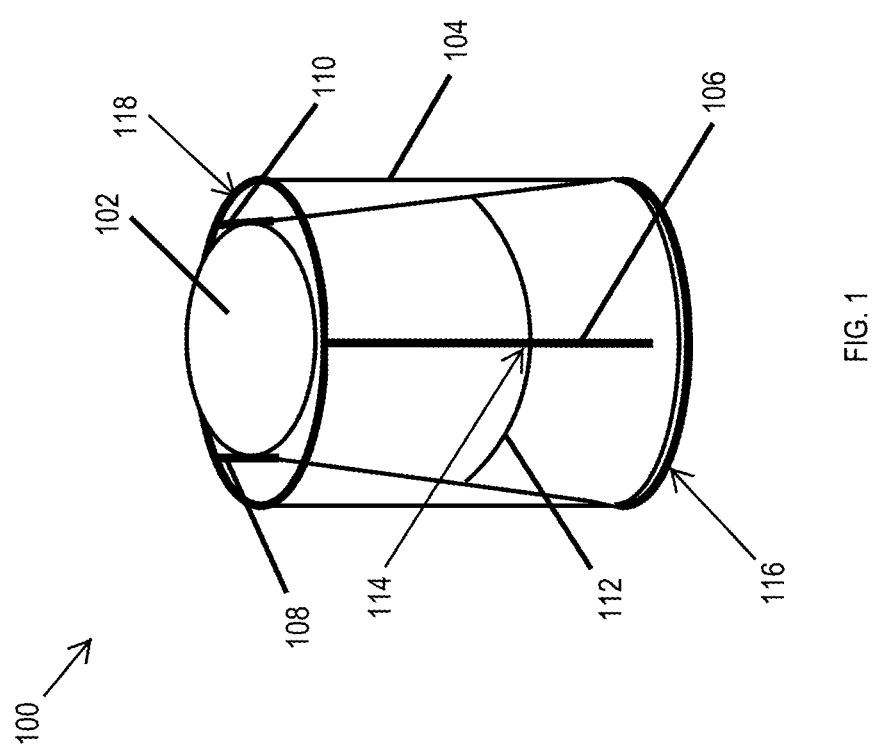
FIG. 1 illustrates a top perspective view of a light pipe assembly according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

FIG. 1 illustrates a top perspective view of a light pipe assembly 100 according to an example embodiment. In some example embodiments, the light pipe assembly 100 includes a light pipe 102 and a light pipe housing 104. For example, the light pipe 102 may be at least partially positioned in a cavity of the light pipe housing 104. In FIG. 1, the light pipe housing 104 is shown as a transparent housing for illustrative purposes.

In some example embodiments, the light pipe housing 104 may include longitudinal crush ribs 106, 108, 110. For example, the longitudinal crush ribs 106-110 may each extend between an opening 116 of the light pipe housing 104 at a first end and an opening 118 of the light pipe housing 104 at an opposite end. The light pipe housing 104 may be made from plastic, polycarbonate, or another suitable material as can be readily understood by those of ordinary skill in the art with the benefit of this disclosure.

In some example embodiments, light that enters the light pipe 102 through a bottom surface of the light pipe 102 travels through the light pipe 102 and exits through a top surface of the light pipe 102 in the orientation of the light pipe 102 shown in FIG. 1. Alternatively, light that enters the light pipe 102 through the top surface of the light pipe 102 travels through the light pipe 102 and exits through the bottom surface of the light pipe 102 in the orientation of the light pipe 102 shown in FIG. 1. To illustrate, the light pipe 102 may be a solid structure, and as the light travels through the light pipe 102, the light may be retained in the light pipe 102 as a result of total internal reflection. The light pipe 102 may be made from polycarbonate or another polymer that is at least partially transparent to allow light to travel therethrough.

In some example embodiments, the light pipe 102 may include a circumferential crush rib 112 that extends annularly around the light pipe 102. As the light pipe 102 is inserted into the cavity of the light pipe housing 104 through the opening of the light pipe housing 104, the circumferential crush rib 112 comes in contact with the longitudinal crush ribs 106-110 and firmly retains the light pipe 102 in the cavity of the light pipe housing 104. To illustrate, as the light pipe 102 is pressed or pushed upward in the cavity of the light pipe housing 104, the longitudinal crush ribs 106-110 and the circumferential crush rib 112 may be deformed at the contact areas between the longitudinal crush ribs 106-110 and the circumferential crush rib 112. For example, the circumferential crush rib 112 may be in contact with the longitudinal crush rib 106 at a contact area 114.

In some example embodiments, the longitudinal crush ribs 108, 110 may have similar contact areas with the circumferential crush rib 112 as the contact area 114. Because the contact between the light pipe 102 and the light pipe housing 104 is limited to the small contact areas between the longitudinal crush ribs 106-110 and the circumferential crush rib 112, the interference of the light pipe housing 104 on the transmission of light through the light pipe 102 may be significantly reduced compared to attachment methods that require larger contact areas between a light pipe and a light pipe housing.

In some example embodiments, the light pipe 102 may have a truncated cone shape as shown in FIG. 1. For example, in some applications, the truncated cone shape of the light pipe 102 may provide improved light collection and transmission through the light pipe 102 in contrast to light pipes that have a different shape (e.g., a uniformly cylindrical shape). The circumferential crush rib 112 may be positioned annularly around a circumference of the light pipe 102 to come in contact with the longitudinal crush ribs 106-110 when the bottom end of the light pipe 102 reaches the bottom opening 116 of the light pipe housing 104.

To illustrate, when the light pipe 102 is pushed upward in the cavity of the light pipe housing 104 and is firmly attached to the light pipe housing 104 by virtue of the pressed contact between the circumferential crush rib 112 and the longitudinal crush ribs 106-110, the bottom end of the light pipe 102 may be flush with or close to being flush with the bottom opening 116 of the light pipe housing 104. Alternatively, the circumferential crush rib 112 may be located around the light pipe 102 to come in contact with the longitudinal crush ribs 106-110 before or after the bottom end of the light pipe 102 reaches the bottom opening 116 of the light pipe housing 104. For example, the circumferential crush rib 112 may be located above or below the location of the circumferential crush rib 112 shown in FIG. 1 without departing from the scope of this disclosure.

In some example embodiments, the light pipe 102 and the light pipe housing 104 may be made using a method such as injection molding, etc. For example, a steel safe method may be used to form the longitudinal crush ribs 106-110 of the light pipe housing 104 and the circumferential crush rib 112 of the light pipe 102 as can be readily understood by those of ordinary skill in the art with the benefit of this disclosure.

The longitudinal crush ribs 106-110 and the circumferential crush rib 112 firmly attach the light pipe 102 to the light pipe housing 104. Because the longitudinal crush ribs 106-110 and the circumferential crush rib 112 come in contact as the light pipe 102 is pushed or pressed upward in the cavity of the light pipe housing 104, the longitudinal crush ribs 106-110 and the circumferential crush rib 112 may also allow the light pipe 102 and the light pipe housing 104 to have relatively larger tolerances in size than otherwise possible. In contrast to attachment methods that require larger areas of contact between a light pipe and a light pipe housing or another structure, the attachment of the light pipe 102 to the light pipe housing 104 using the longitudinal crush ribs 106-110 and the circumferential crush rib 112 poses significantly less interference with total internal reflection as light travels through the light pipe 102. The relatively small contact areas between the longitudinal crush ribs 106-110 and the circumferential crush rib 112 as well as the truncated cone shape of the light pipe 102 may result in improved efficiency of transmission of light through the light pipe 102. The relatively small contact areas between the longitudinal crush ribs 106-110 and the circumferential crush rib 112 also provides more flexibility in the selection of the color of the light pipe housing 104 as can be readily understood by those of ordinary skill in the art with the benefit of this disclosure.

In some alternative embodiments, the light pipe 102 and/or the light pipe housing 104 may have a different shape than shown without departing from the scope of this disclosure. In some alternative embodiments, the longitudinal crush ribs 106-110 may extend down all the way to the opening 116 of the light pipe housing 104 without departing from the scope of this disclosure. In some alternative embodiments, the longitudinal crush ribs 106-110 may not extend all the way to the opening 118 of the light pipe housing 104 without departing from the scope of this disclosure. In some example embodiments, the light pipe housing 104 may be integrally formed with a larger housing such as a sensor housing, a lighting fixture housing, etc. without departing from the scope of this disclosure.

In some example embodiments, the light pipe assembly 100 may be oriented differently than shown in FIG. 1 without departing from the scope of this disclosure. For example, considering the orientation of the light pipe assembly 100 shown in FIG. 1 as a vertical orientation, the light pipe assembly 100 may be rotated to an angle in a 360-degree rotation of the light pipe assembly 100. For example, the light pipe assembly 100 may be horizontally oriented or flipped 180 degrees.

FIG. 2A illustrates a top perspective view of the light pipe 102 shown in FIG. 1 according to an example embodiment, and FIG. 2B illustrates a top view of the light pipe 102 shown in FIG. 1 according to an example embodiment. Referring to FIGS. 1-2B, in some example embodiments, the light pipe 102 has a truncated cone shape and may include a narrow surface 202 and a wide surface 204, the narrow surface 202 is narrower than the wide surface 204. For example, a surface 206 of the light pipe extending between the narrow surface 202 and the wide surface 204 may be slanted at an angle that results a desirable total internal reflection as light travels through the light pipe 102 from the narrow surface 202 to the wide surface 204. As a non-limiting example, the surface 206 may be slanted at 6 degrees relative to a vertical line extending through the outer perimeter 208 of the narrow surface 202 or the outer perimeter 210 of the wide surface 204.

In some example embodiments, the length of the circumferential crush rib 112 between the wide surface 204 and the narrow surface 202 may be a few millimeters (e.g., 35 millimeters) or may be several inches or longer. The diameter of the wide surface 204 may also be a few millimeters (e.g., 10 millimeters) or may be smaller or larger. The circumferential crush rib 112 may extend outwardly from the surface 106 less than a millimeter. Alternatively, the circumferential crush rib 112 may extend outwardly from the surface 106 a millimeter or more depending on a particular application. In some example embodiments, the thickness of the circumferential crush rib 112 may be less than a millimeter or may be larger depending on a particular application. The circumferential crush rib 112 may be round or pointed as the circumferential crush rib 112 extends outwardly from the surface 206.

In some example embodiments, the light pipe 102 may have another shape where a narrow surface at one end of the light pipe is narrower than a wide surface at an opposite end of the light pipe, where light can travel through the light pipe 102 in either direction between the narrow surface and the wide surface. In some alternative embodiments, the light pipe 102 may have a non-symmetrical truncated cone shape without departing from the scope of this disclosure. In some alternative embodiments, the circumferential crush rib 112 may be at a different location between the narrow surface 202 and the wide surface 204 without departing from the scope of this disclosure. For example, the circumferential crush rib 112 may be closer to the narrow surface 202 than shown without departing from the scope of this disclosure. As another example, the circumferential crush rib 112 may be closer to the wide surface 204 than shown without departing from the scope of this disclosure.

Figure 3C:
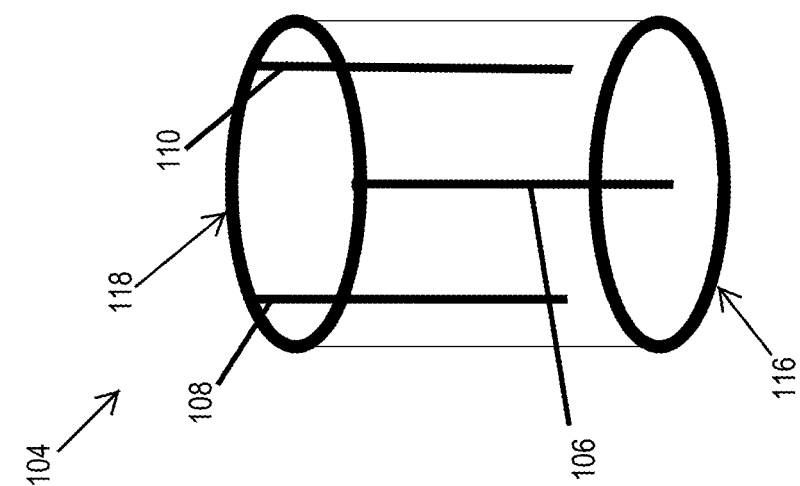
FIG. 3C illustrates the light pipe housing of FIG. 1 illustratively shown as a transparent housing according to an example embodiment.
Figure 3B:
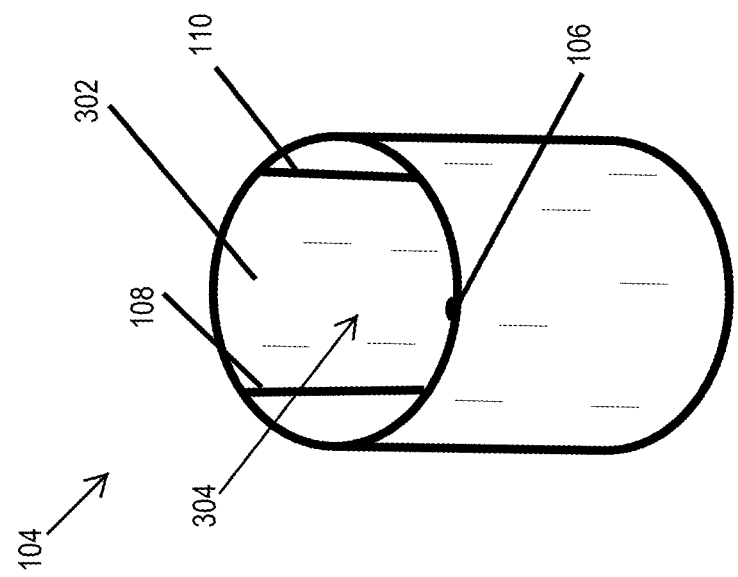
FIG. 3B illustrates another top perspective view of the light pipe housing shown in FIG. 1 according to an example embodiment.
Figure 3A:
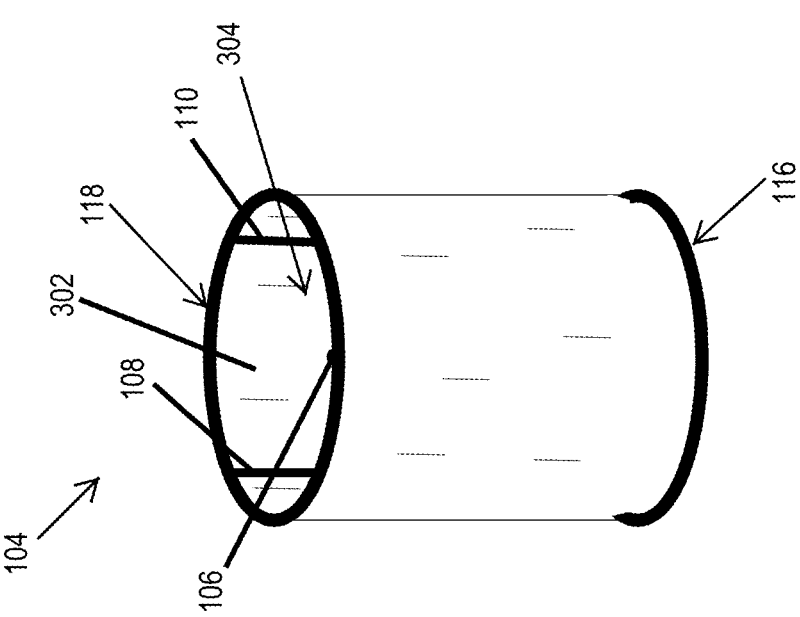
FIG. 3A illustrates a top perspective view of the light pipe housing shown in FIG. 1 according to an example embodiment.

FIG. 3A illustrates a top perspective view of the light pipe housing 104 shown in FIG. 1 according to an example embodiment. FIG. 3B illustrates another top perspective view of the light pipe housing 104 shown in FIG. 1 according to an example embodiment, and FIG. 3C illustrates the light pipe housing 104 of FIG. 1 illustratively shown as a transparent housing according to an example embodiment. Referring to FIGS. 1-3C, in some example embodiments, the longitudinal crush ribs 106-110 may be on the inside surface 302 of the light pipe housing 104. For example, the longitudinal crush ribs 106-110 may be distributed evenly around the light pipe housing 104. Alternatively, the longitudinal crush ribs 106-110 may be distributed unevenly around the light pipe housing 104. For example, the longitudinal crush ribs 108 and 110 may be closer to each other than to the longitudinal crush rib 106.

In some example embodiments, as the light pipe 102 is pushed up into the cavity 304 through the opening 116 such that the narrow surface 202 of the light pipe 102 enters the cavity 304 from below the light pipe housing 104, the circumferential crush rib 112 comes in contact with the longitudinal crush ribs 106-110. As the light pipe 102 is pushed further upward, the circumferential crush rib 112 and the longitudinal crush ribs 106-110 may deform and firmly retain the light pipe 102 in the cavity 304 of the light pipe housing 104. In some example embodiments, the light pipe 102 may be inserted down into the cavity 304, where the narrow surface 202 of the light pipe 102 enters the cavity 304 through the opening 118 ahead of the wide surface 204 of the light pipe 102.

In some example embodiments, the longitudinal crush ribs 106-110 may extend down from the perimeter of the opening 118 but may not reach the perimeter of the opening 116 as more clearly shown in FIG. 3C. Alternatively, one or more of the longitudinal crush ribs 106-110 may extend all the way down to the perimeter of the opening 116 without departing from the scope of this disclosure. In some example embodiments, one or more of the longitudinal crush ribs 106-110 may not extend up to the perimeter of the opening 118 without departing from the scope of this disclosure. In some alternative embodiments, the light pipe housing 104 may include more or fewer longitudinal crush ribs 106-110 than shown without departing from the scope of this disclosure. For example, the light pipe housing 104 may include one, two, four, or more longitudinal crush ribs. In some alternative embodiments, the light pipe housing 104 may have a non-cylindrical shape inner and/or outer shape without departing from the scope of this disclosure.

Figure 4:
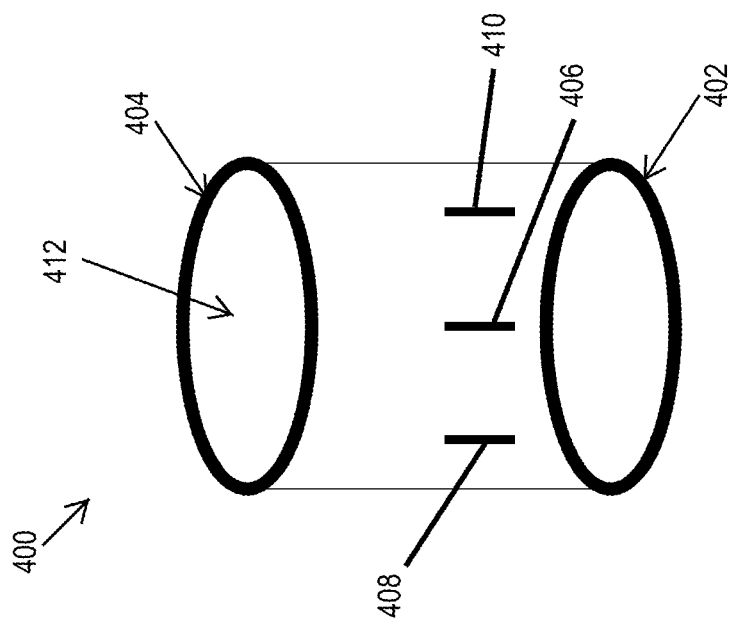
FIG. 4 illustrates a top perspective view of a light pipe housing illustratively shown as a transparent housing according to another example embodiment.

FIG. 4 illustrates a top perspective view of a light pipe housing 400 illustratively shown as a transparent housing according to another example embodiment. In some example embodiments, the light pipe housing 400 may be used in place of the light pipe housing 104 in the light pipe assembly 100 of FIG. 1. Referring to FIGS. 1-4, the light pipe housing 400 has an opening 402 at one end and an opening 404 on an opposite end. The light pipe housing 400 may also include longitudinal crush ribs 406-410 that may be used to firmly retain the light pipe 102 in a cavity 412 of the light pipe housing 400 in a similar manner as described with respect to FIGS. 1-3C. In contrast to the longitudinal crush ribs 106-110 of the light pipe housing 104 of FIGS. 1 and 3A-3C, the longitudinal crush ribs 406-410 of the light pipe housing 400 may each have a relatively short length compared to the height of the light pipe housing 400.

In some example embodiments, the longitudinal crush ribs 406-410 may be located and may each have a length to accommodate expected variations in the location of the circumferential crush rib 112 of the light pipe 102 that may be inserted into the cavity 412 of the light pipe housing 400. For example, the longitudinal crush ribs 406-410 may be located on the inside surface of the light pipe housing 400 such that, as the light pipe 102 is inserted upward into the cavity 410 through the opening 402, the circumferential crush rib 112 may come in contact with the longitudinal crush ribs 406-410 and firmly retain the light pipe 102 in the cavity 412 in a similar manner as described above.

In some example embodiments, the longitudinal crush ribs 406-410 may be longer or shorter than shown in FIG. 4 without departing from the scope of this disclosure. In some example embodiments, the longitudinal crush ribs 406-410 may be equally spaced from each other or may be unevenly spaced from each other. In some alternative embodiments, the light pipe housing 400 may include more or fewer longitudinal crush ribs 406-410 than shown without departing from the scope of this disclosure. For example, the light pipe housing 400 may include one, two, four, or more longitudinal crush ribs.

Figure 5:
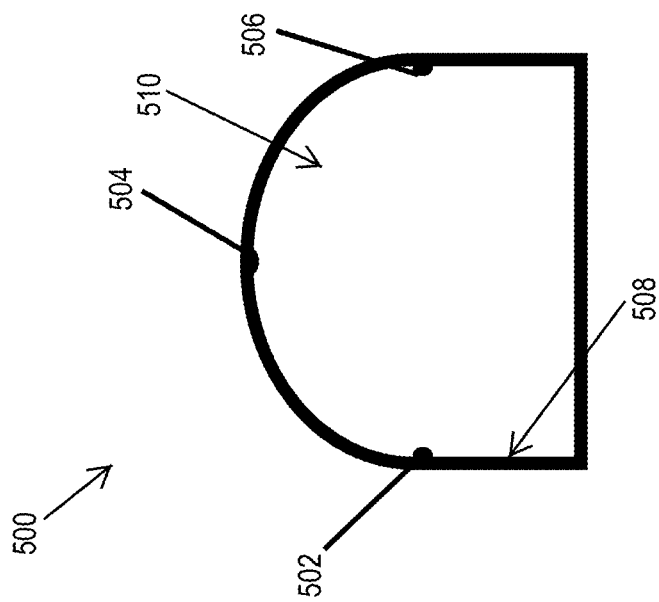
FIG. 5 illustrates a top view of a light pipe housing according to another example embodiment.

FIG. 5 illustrates a top view of a light pipe housing 500 according to another example embodiment. In some example embodiments, the light pipe housing 500 may be used in place of the light pipe housing 104 in the light pipe assembly 100 of FIG. 1. In some example embodiments, the light pipe housing 500 may include longitudinal crush ribs 502-506 on an inner surface 508 of the light pipe housing 500. In contrast to the light pipe housing 104 of FIGS. 1 and 3A-3C, the light pipe housing 500 is non-cylindrical but can still receive the light pipe 102 in the cavity 510 of the light pipe housing 500 in as similar manner as described with respect to the light pipe housing 104.

In some alternative embodiments, the light pipe housing 500 may include more or fewer longitudinal crush ribs 502-506 than shown without departing from the scope of this disclosure. For example, the light pipe housing 500 may include one, two, four, or more longitudinal crush ribs. In some alternative embodiments, the light pipe housing 600 may have a different non-cylindrical shape than shown without departing from the scope of this disclosure.

Figure 6:
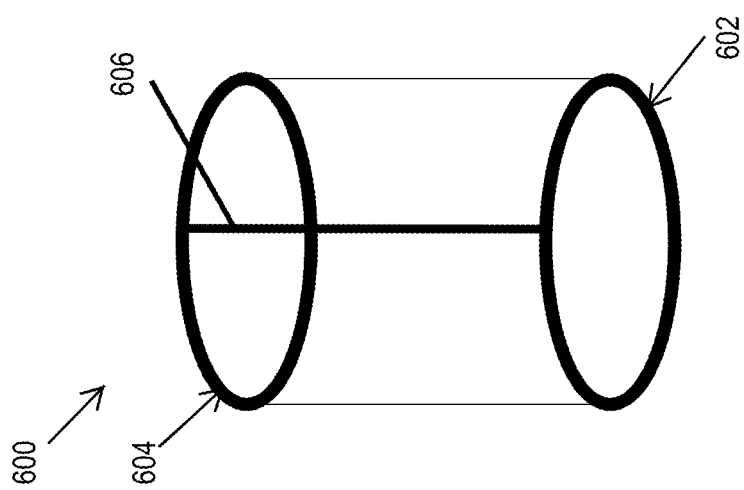
FIG. 6 illustrates a top perspective view of a light pipe housing illustratively shown as a transparent housing according to another example embodiment.

FIG. 6 illustrates a top perspective view of a light pipe housing 600 illustratively shown as a transparent housing according to another example embodiment. In some example embodiments, the light pipe housing 600 may be used in place of the light pipe housing 104 in the light pipe assembly 100 of FIG. 1. In some example embodiments, the light pipe housing 600 has an opening 602 at one end and an opening 604 on an opposite end. The light pipe housing 600 may also include a longitudinal crush rib 606 that, together with the circumferential crush rib 112 of the light pipe 102, may firmly retain the light pipe 102 of FIGS. 1-2B in a cavity of the light pipe housing 600. For example, the light pipe 102 may be pushed upward into the cavity of the light pipe housing 600 through the opening 602 such that the circumferential crush rib 112 of the light pipe 102 comes in contact with the longitudinal crush rib 606 and such that the circumferential crush rib 112 of the light pipe 102 comes in contact with the inner surface of the light pipe housing 600. To illustrate, the circumferential crush rib 112 of the light pipe 102 comes in contact with the inner surface of the light pipe housing 600 in an area of the light pipe housing 600 directly across from the longitudinal crush rib 606.

In some example embodiments, the longitudinal crush rib 606 may extend the entire length of the light pipe housing 600 between the perimeter of the opening 602 and the perimeter of the opening 604. In some alternative embodiments, the longitudinal crush rib 606 may be terminated above the perimeter of the opening 602 and/or below the perimeter of the opening 604 without departing from the scope of this disclosure. For example, the longitudinal crush rib 606 may be similar to one of the longitudinal crush ribs 406-408 shown in FIG. 4. In some alternative embodiments, the light pipe housing 600 may have a different shape than shown without departing from the scope of this disclosure.

Figure 7:
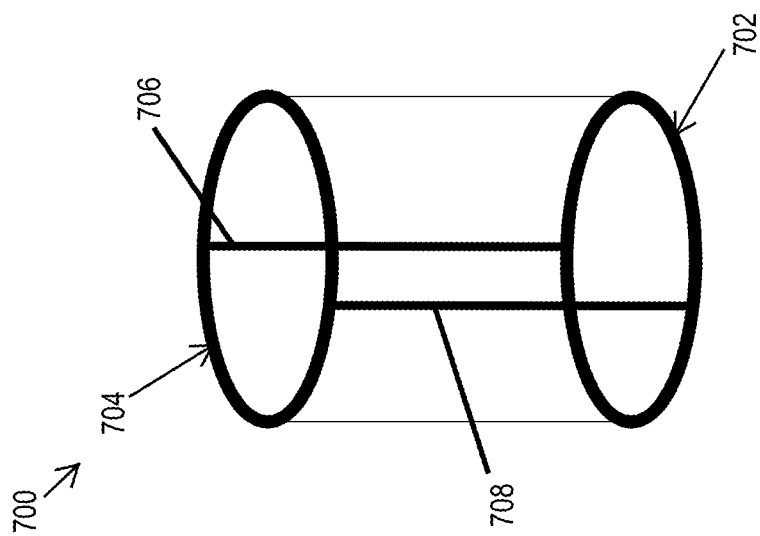
FIG. 7 illustrates a top perspective view of a light pipe housing illustratively shown as a transparent housing according to another example embodiment.

FIG. 7 illustrates a top perspective view of a light pipe housing 700 illustratively shown as a transparent housing according to another example embodiment. In some example embodiments, the light pipe housing 700 may be used in place of the light pipe housing 104 in the light pipe assembly 100 of FIG. 1. In some example embodiments, the light pipe housing 700 has an opening 702 at one end and an opening 704 on an opposite end. The light pipe housing 700 may also include longitudinal crush rib 706, 708 that together with the circumferential crush rib 112 of the light pipe 102 may firmly retain the light pipe 102 of FIGS. 1-2B in a cavity of the light pipe housing 700. For example, the light pipe 102 may be pushed upward into the cavity of the light pipe housing 700 through the opening 702 such that the circumferential crush rib 112 of the light pipe 102 comes in contact with the longitudinal crush ribs 707, 708 in a similar manner as described with respect to FIG. 1.

In some example embodiments, the longitudinal crush ribs 707, 708 may be across from each other on the inner surface of the light pipe housing 700. The longitudinal crush ribs 707, 708 may also extend the entire length of the light pipe housing 700 between the perimeter of the opening 702 and the perimeter of the opening 704. In some alternative embodiments, the one or both of the longitudinal crush ribs 707, 708 may be terminated above the perimeter of the opening 702 and/or below the perimeter of the opening 704 without departing from the scope of this disclosure. For example, the longitudinal crush ribs 706, 708 may be similar to the longitudinal crush ribs 406-408 shown in FIG. 4. In some alternative embodiments, the light pipe housing 700 may have a different shape than shown without departing from the scope of this disclosure.

Figure 8:
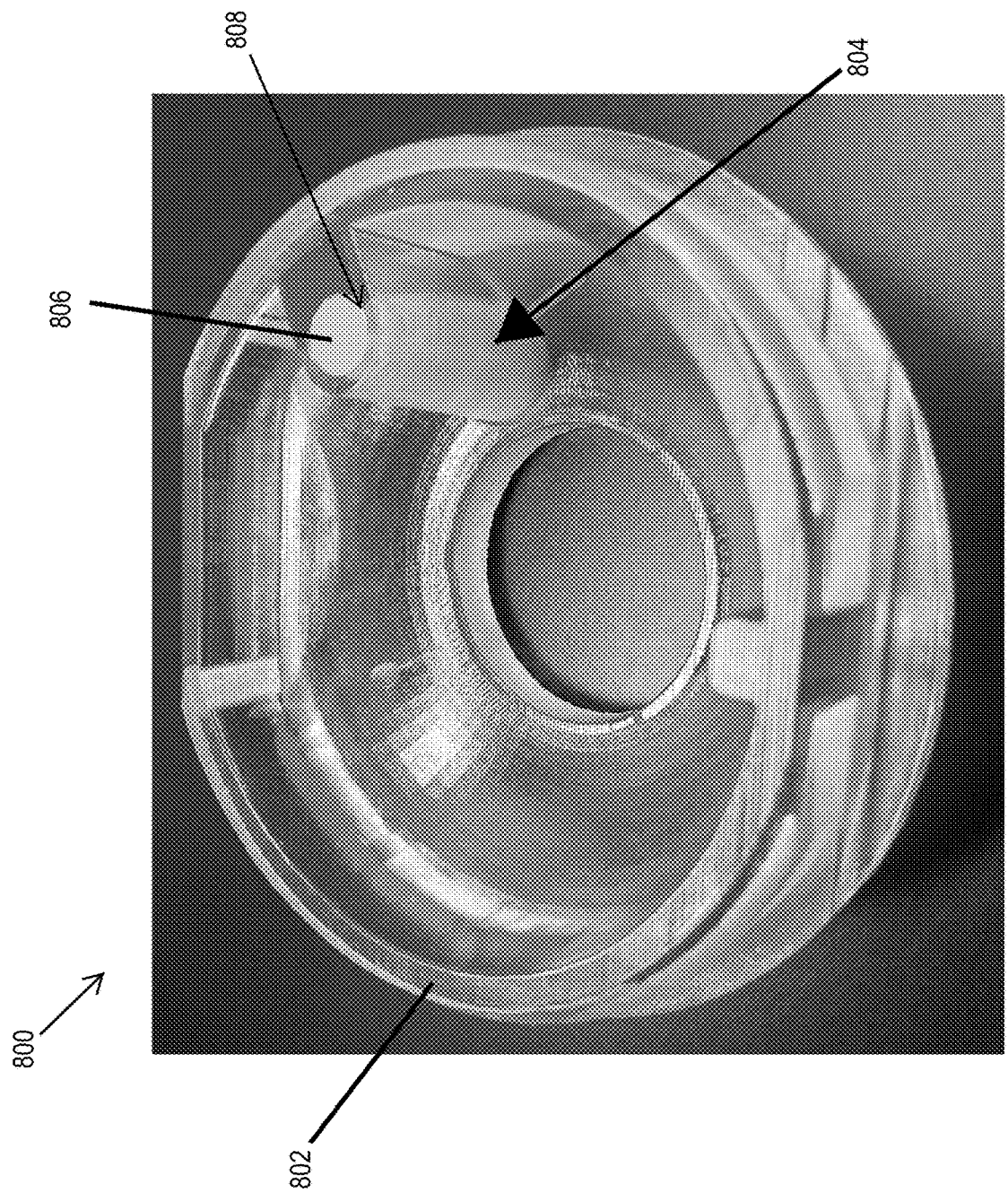
FIG. 8 illustrates a top perspective view of a light pipe assembly according to another example embodiment.

FIG. 8 illustrates a top perspective view of a light pipe assembly 800 according to another example embodiment. In some example embodiments, the light pipe assembly 800 includes a cover 802 that includes a light pipe housing 804. For example, the cover 802 may be made from plastic, polycarbonate, etc. using a method such as injection molding as can be readily understood by those of ordinary skill in the art with the benefit of this disclosure. For example, the cover 802 may be a cover structure of a device such as a sensor, etc.

In some example embodiments, a light pipe 806 may be positioned in the cavity of the light pipe housing 804. For example, the light pipe 806 may be made from a transparent material, such as a polycarbonate. The light pipe 806 may correspond to the light pipe 102 of FIG. 1. To illustrate, the light pipe 802 may include a circumferential crush rib similar to the circumferential crush rib 112 of the light pipe 102, and the light pipe housing 804 may include one or more longitudinal crush ribs similar to the longitudinal crush ribs 106-110 of the light pipe housing 104 of FIG. 1. The light pipe 802 may be attached to the light pipe housing 804 by the circumferential crush rib of the light pipe 802 and the one or more longitudinal crush ribs of the light pipe housing 804 in a similar manner as described above. For example, the light pipe housing 804 may have an opening on an opposite side from an opening 808 of the light pipe housing 804.

In some example embodiments, a photosensor component/circuit may be positioned above the light pipe 806 at the opening 808 of the light pipe housing 804. For example, light that travels up through the light pipe 806 may exit the light pipe 806 and reach the photosensor component/circuit. Alternatively, a light source (e.g., an LED light source) may be positioned at the opening 808 and may emit its light (e.g., an indicator light) into the light pipe 806. The light may travel down through the light pipe 806 and may be emitted on the opposite end of the light pipe 806.

In some alternative embodiments, the light pipe housing 804 may be at a different location than shown without departing from the scope of this disclosure. In some alternative embodiments, the cover 802 and/or the light pipe housing 804 may have a different shape than shown without departing from the scope of this disclosure. In some alternative embodiments, the light pipe housing 804 may be similar to the light pipe housing 104, 400, 500, 600, or 700 without departing from the scope of this disclosure.

Figure 9B:
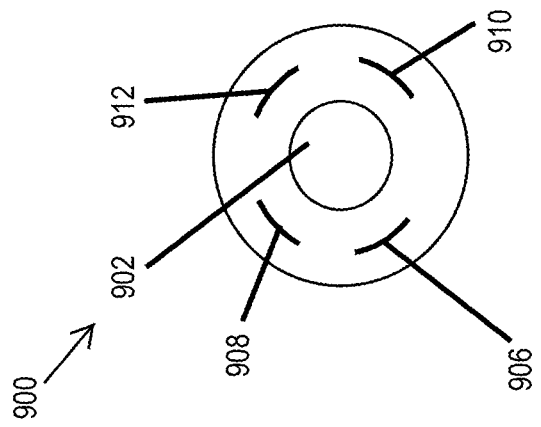
FIG. 9B illustrates a top view of the light pipe shown in FIG. 9A according to an example embodiment.
Figure 9A:
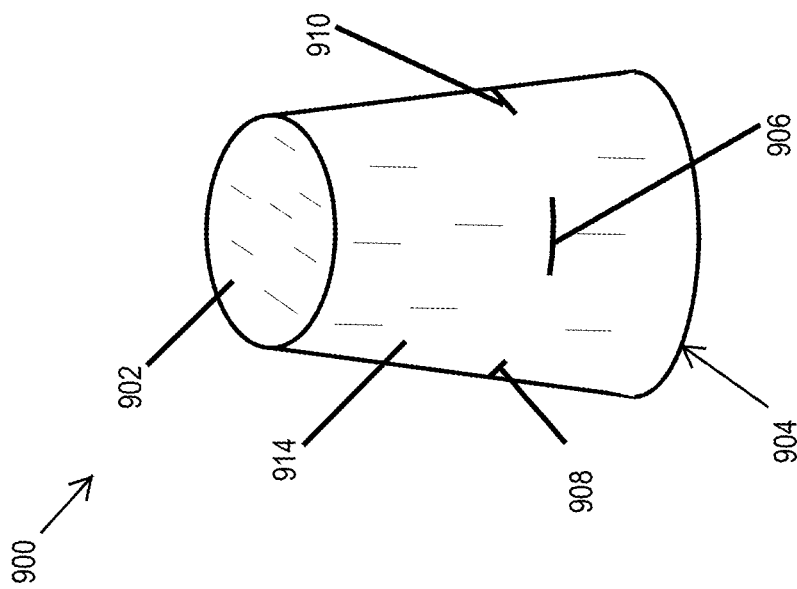
FIG. 9A illustrates a top perspective view of a light pipe according to another example embodiment.

FIG. 9A illustrates a top perspective view of a light pipe 902 according to another example embodiment, and FIG. 9B illustrates a top view of the light pipe 900 shown in FIG. 9A according to an example embodiment. In some example embodiments, the light pipe 900 may be used instead of the light pipe 102 in the light pipe assembly 100 without departing from the scope of this disclosure. In some example embodiments, the light pipe 900 may be used instead of the light pipe 806 in the light pipe assembly 800 without departing from the scope of this disclosure.

In some example embodiments, the light pipe 900 may include a narrow surface 902 and a wide surface 904 on an opposite end of the light pipe 900 from the narrow surface 902. The light pipe 900 may include a circumferential crush rib that includes crush rib segments 906, 908, 910, and 912. In contrast to the circumferential crush rib 112 that is may be a continuous annular crush rib (as more clearly shown in FIGS. 2A and 2B), the crush rib segments 906-912 are distributed around the circumference of a surface 914 of the light pipe 900.

In some example embodiments, the crush rib segments 906-912 can be used to retain the light pipe 900 in a cavity of a light pipe housing, such as the light pipe housing 104 or another one the light pipe housings described above in a similar manner as described with respect to the light pipe 102 of FIG. 1.

In some example embodiments, the light pipe 900 may be made from plastic, polycarbonate, or another suitable material as can be readily understood by those of ordinary skill in the art with the benefit of this disclosure. The light pipe 900 may be made using a method such as injection molding. For example, a steel safe method may be used to form the crush rib segments 906-912 of the light pipe 900 as can be readily understood by those of ordinary skill in the art with the benefit of this disclosure.

In some example embodiments, the crush rib segments 906-912 may be located higher or lower on the surface 914 than shown in FIG. 9A without departing from the scope of this disclosure. In some example embodiments, the light pipe 900 may have a truncated cone shape as shown in FIGS. 9A and 9B. In some alternative embodiments, the light pipe 900 may have a different shape than shown without departing from the scope of this disclosure. In some alternative embodiments, the light pipe 900 may have a non-symmetrical truncated cone shape.

Figure 10:
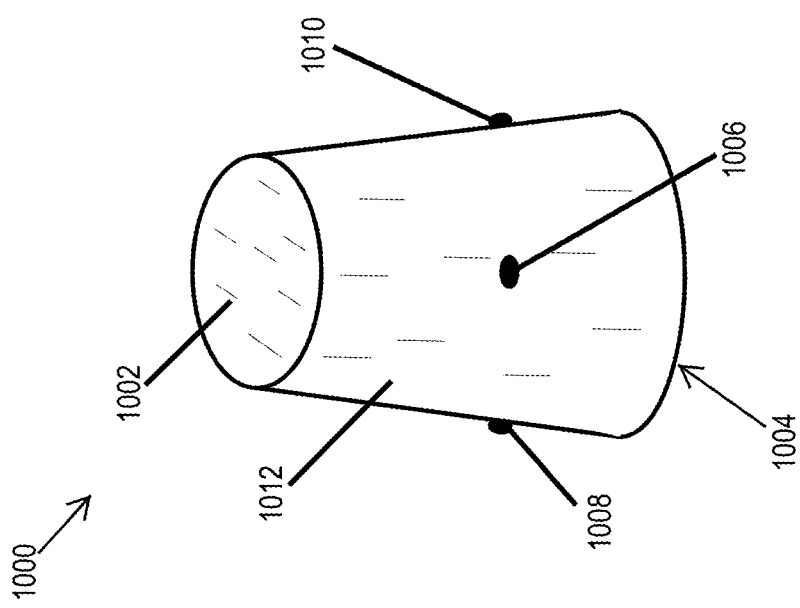
FIG. 10 illustrates a top perspective view of a light pipe according to another example embodiment.

FIG. 10 illustrates a top perspective view of a light pipe 1000 according to another example embodiment. In some example embodiments, the light pipe 1000 may be used instead of the light pipe 102 in the light pipe assembly 100 without departing from the scope of this disclosure. In some example embodiments, the light pipe 1000 may be used instead of the light pipe 806 in the light pipe assembly 800 without departing from the scope of this disclosure.

In some example embodiments, the light pipe 1000 may include a narrow surface 1002 and a wide surface 1004 on an opposite end of the light pipe 900 from the narrow surface 1002. The light pipe 1000 may include a circumferential crush rib that includes crush rib bumps 1006, 1008, and 1010. In contrast to the circumferential crush rib 112 that is may be a continuous annular crush rib (as more clearly shown in FIGS. 2A and 2B), the crush rib bumps 1006-1010 are distributed around the circumference of a surface 1012 of the light pipe 1000.

In some example embodiments, the crush rib bumps 1006-1010 can be used to retain the light pipe 900 in a cavity of a light pipe housing, such as the light pipe housing 104 or another one the light pipe housings described above in a similar manner as described with respect to the light pipe 102 of FIG. 1.

In some example embodiments, the light pipe 1000 may be made from plastic, polycarbonate, or another suitable material as can be readily understood by those of ordinary skill in the art with the benefit of this disclosure. The light pipe 1000 may be made using a method such as injection molding. For example, a steel safe method may be used to form the crush rib bumps 1006-1010 of the light pipe 1000 as can be readily understood by those of ordinary skill in the art with the benefit of this disclosure.

In some example embodiments, the crush rib bumps 1006-1010 may be located higher or lower on the surface 1012 than shown in FIG. 10 without departing from the scope of this disclosure. In some example embodiments, the light pipe 1000 may have a truncated cone shape as shown in FIG. 10. In some alternative embodiments, the light pipe 1000 may have a different shape than shown without departing from the scope of this disclosure. In some alternative embodiments, the light pipe 1000 may have a non-symmetrical truncated cone shape.

Figure 11:
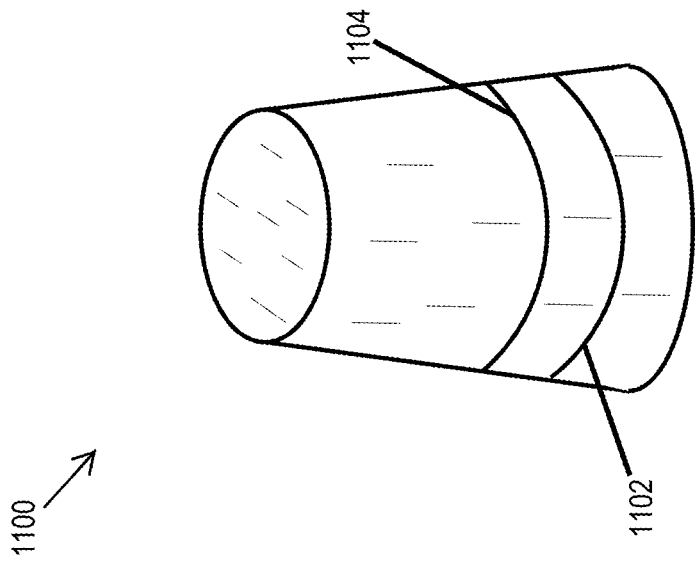
FIG. 11 illustrates a top perspective view of a light pipe according to another example embodiment.

FIG. 11 illustrates a top perspective view of a light pipe 1100 according to another example embodiment. In some example embodiments, the light pipe 1100 may be used instead of the light pipe 102 in the light pipe assembly 100 without departing from the scope of this disclosure. In some example embodiments, the light pipe 1100 may be used instead of the light pipe 806 in the light pipe assembly 800 without departing from the scope of this disclosure. In contrast to the circumferential crush rib 112 of the light pipe 102 shown with in FIGS. 1-2B, the light pipe 1100 includes two circumferential crush ribs 1102, 1104 that may be positioned annularly around the light pipe 1100.

In some example embodiments, the light pipe 1100 may be made from plastic, polycarbonate, or another suitable material as can be readily understood by those of ordinary skill in the art with the benefit of this disclosure. The light pipe 1100 may be made using a method such as injection molding. For example, a steel safe method may be used to form the circumferential crush ribs 1102, 1104 as can be readily understood by those of ordinary skill in the art with the benefit of this disclosure.

In some alternative embodiments, one or both of the circumferential crush ribs 1102, 1104 may include crush rib segments similar to the crush rib segments shown in FIGS. 9A and 9B. In some example embodiments, one or both of the circumferential crush ribs 1102, 1104 may be located higher or lower than shown in FIG. 11 without departing from the scope of this disclosure. In some example embodiments, the light pipe 1100 may have a truncated cone shape as shown in FIG. 11. In some alternative embodiments, the light pipe 1100 may have a different shape than shown without departing from the scope of this disclosure. In some alternative embodiments, the light pipe 1100 may have a non-symmetrical truncated cone shape.

FIG. 12 illustrates a top view of a light pipe 1200 according to another example embodiment. In some example embodiments, the light pipe 1200 may have an elliptical shape in the top view shown in FIG. 12. The light pipe 1200 may include a narrow surface 1202 and a wide surface 1204 on an opposite end of the light pipe 1200 from the narrow surface 1202. The light pipe 1200 may also include a circumferential crush rib 1206 that is annularly around the light pipe 1200 between the narrow surface 1202 and the wide surface 1204.

FIG. 13 illustrates a top view of a light pipe 1300 according to another example embodiment. In some example embodiments, the light pipe 1300 may have a hexagonal shape in the top view shown in FIG. 13. The light pipe 1300 may include a narrow surface 1302 and a wide surface 1304 on an opposite end of the light pipe 1300 from the narrow surface 1302. The light pipe 1300 may also include a circumferential crush rib 1306 that is annularly around the light pipe 1300 between the narrow surface 1302 and the wide surface 1304.

FIG. 14 illustrates a top view of a light pipe 1400 according to another example embodiment. In some example embodiments, the light pipe 1400 may have a rectangular shape in the top view shown in FIG. 14. The light pipe 1400 may include a narrow surface 1402 and a wide surface 1404 on an opposite end of the light pipe 1400 from the narrow surface 1402. The light pipe 1400 may also include a circumferential crush rib 1406 that is annularly around the light pipe 1400 between the narrow surface 1402 and the wide surface 1404.

In some example embodiments, each light pipe 1200, 1300, 1400 may be made from plastic, polycarbonate, or another suitable material as can be readily understood by those of ordinary skill in the art with the benefit of this disclosure. For example, each light pipe 1200, 1300, 1400 may be made using a method such as injection molding, and the crush ribs may be made a steel safe method as can be readily understood by those of ordinary skill in the art with the benefit of this disclosure.

In some alternative embodiments, each of the light pipe 1200, 1300, 1400 may be used in a light pipe assembly, such as the light pipe assembly 100 and the light pipe assembly 800, in a similar manner as described above, for example, with respect to the light pipe 102. To illustrate, one or more circumferential crush ribs of the light pipe 1200, 1300, 1400 along with the longitudinal crush ribs of a light pipe housing, such as the light pipe housing 104, may retain the particular light pipe 1200, 1300, 1400 in the cavity of the respective light pipe housing.

In some alternative embodiments, each of the light pipes 1200-1400 may include more than one circumferential crush ribs without departing from the scope of this disclosure. In some alternative embodiments, one or more of the light pipes 1200-1400 may have a different shape than shown without departing from the scope of this disclosure.

Figure 15:
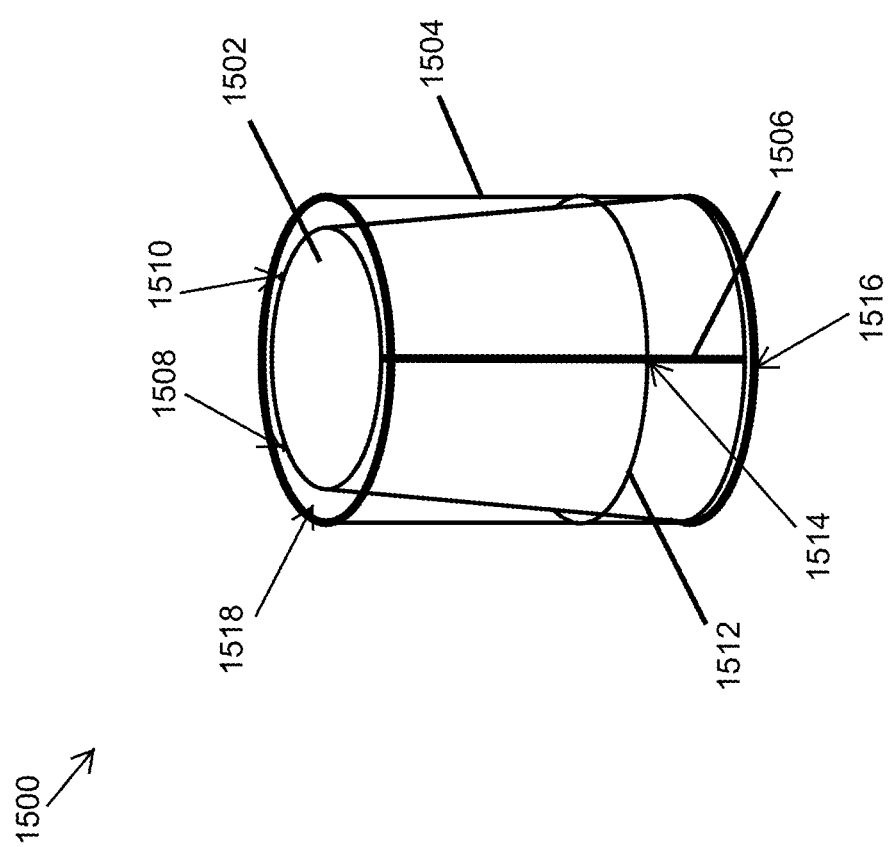
FIG. 15 illustrates a top perspective view of a light pipe assembly according to another example embodiment.

FIG. 15 illustrates a top perspective view of a light pipe assembly 1500 according to another example embodiment. In some example embodiments, the light pipe assembly 1500 includes a light pipe 1502 and a light pipe housing 1504. For example, the light pipe 1502 may be at least partially positioned in a cavity of the light pipe housing 1504. In FIG. 15, the light pipe housing 1504 is shown as a transparent housing for illustrative purposes to more clearly show details of the light pipe 1502 and light pipe housing 1504.

In some example embodiments, the light pipe 1502 may include longitudinal crush ribs 1506, 1508, 1510. For example, the longitudinal crush ribs 1506-1510 may each extend between a top end of the light pipe 1502 and a bottom end of the light pipe 1502. Light that enters the light pipe 1502 through a bottom surface of the light pipe 1502 travels through the light pipe 1502 and exits through a top surface of the light pipe 1502 in the orientation of the light pipe 1502 shown in FIG. 15. Alternatively, light that enters the light pipe 1502 through the top surface of the light pipe 1502 travels through the light pipe 1502 and exits through the bottom surface of the light pipe 1502 in the orientation of the light pipe 1502 shown in FIG. 15. To illustrate, the light pipe 1502 may be a solid structure, and as the light travels through the light pipe 1502, the light may be retained in the light pipe 1502 as a result of total internal reflection. The light pipe 1502 may be made from polycarbonate or another polymer that is at least partially transparent to allow light to travel through the light pipe 1502.

In some example embodiments, the light pipe housing 1504 may include a circumferential crush rib 1512 that extends out annularly on the inside surface of the light pipe housing 1504 toward the cavity of the light pipe housing 1504. The light pipe housing 1504 may be made from plastic, polycarbonate, or another suitable material as can be readily understood by those of ordinary skill in the art with the benefit of this disclosure.

As the light pipe 1502 is inserted upward into the cavity of the light pipe housing 1504 through a bottom opening 1516 of the light pipe housing 1504 toward a top opening 1518 of the light pipe housing 1504, the circumferential crush rib 1512 of the light pipe housing 1504 comes in contact with the longitudinal crush ribs 1506-1510 of the light pipe 1502 and firmly retains the light pipe 1502 in the cavity of the light pipe housing 1504. To illustrate, as the light pipe 1502 is pressed or pushed upward in the cavity of the light pipe housing 1504, the longitudinal crush ribs 1506-1510 and the circumferential crush rib 1512 may be deformed at the contact areas between the longitudinal crush ribs 1506-1510 and the circumferential crush rib 1512. For example, the circumferential crush rib 1512 may be in contact with the longitudinal crush rib 1506 at a contact area 1514.

In some example embodiments, the longitudinal crush ribs 1508, 1510 may have similar contact areas with the circumferential crush rib 1512 as the contact area 1514. Because the contact between the light pipe 1502 and the light pipe housing 1504 is limited to the small contact areas between the longitudinal crush ribs 1506-1510 and the circumferential crush rib 1512, the interference of the light pipe housing 1504 on the transmission of light through the light pipe 102 may be significantly reduced compared to attachment methods that require larger contact areas between a light pipe and a light pipe housing.

In some example embodiments, the light pipe 1502 may have a truncated cone shape as shown in FIG. 15. For example, in some applications, the truncated cone shape of the light pipe 1502 may provide improved light collection and transmission through the light pipe 1502 in contrast to light pipes that have a different shape (e.g., a uniformly cylindrical shape). The circumferential crush rib 1512 may be located on the light pipe housing 1504 to come in contact with the longitudinal crush ribs 1506-1510 when the bottom end of the light pipe 1502 reaches the bottom opening 1516 of the light pipe housing 1504. Alternatively, the circumferential crush rib 1512 may be located to come in contact with the longitudinal crush ribs 1506-1510 before or after the bottom end of the light pipe 102 reaches the bottom opening 1516 of the light pipe housing 1504.

In some example embodiments, the light pipe 1502 and the light pipe housing 1504 may be made using a method such as injection molding, etc. For example, a steel safe method may be used to form the longitudinal crush ribs 1506-1510 and the circumferential crush rib 1512 as can be readily understood by those of ordinary skill in the art with the benefit of this disclosure.

The longitudinal crush ribs 1506-1510 and the circumferential crush rib 1512 firmly attach the light pipe 1502 to the light pipe housing 1504. Because the longitudinal crush ribs 1506-1510 and the circumferential crush rib 1512 come in contact as the light pipe 1502 is pushed or pressed upward in the cavity of the light pipe housing 1504, the longitudinal crush ribs 1506-1510 and the circumferential crush rib 1512 may also allow the light pipe 1502 and the light pipe housing 1504 to have relatively larger tolerances in size than otherwise possible. In contrast to attachment methods that require larger areas of contact between a light pipe and a light pipe housing or another structure, the attachment of the light pipe 1502 to the light pipe housing 1504 using the longitudinal crush ribs 1506-1510 and the circumferential crush rib 1512 poses significantly less interference with total internal reflection as light travels through the light pipe 102. The relatively small contact areas between the longitudinal crush ribs 1506-1510 and the circumferential crush rib 1512 as well as the truncated cone shape of the light pipe 1502 may result in improved efficiency of transmission of light through the light pipe 1502. The relatively small contact areas between the longitudinal crush ribs 1506-1510 and the circumferential crush rib 1512 also provides more flexibility in the selection of the color of the light pipe housing 1504 as can be readily understood by those of ordinary skill in the art with the benefit of this disclosure.

In some alternative embodiments, the light pipe 1502 and/or the light pipe housing 1504 may have a different shape than shown without departing from the scope of this disclosure. In some alternative embodiments, the light pipe 1502 may include fewer (e.g., one or two) or more (e.g., four) than three longitudinal crush ribs without departing from the scope of this disclosure. In some alternative embodiments, the longitudinal crush ribs 1506-1510 may not extend the entire length of the light pipe 1502 without departing from the scope of this disclosure. For example, the longitudinal crush ribs 1506-1510 may not extend all the way to the top end and/or the bottom end of the light pipe 1502 without departing from the scope of this disclosure. In some example embodiments, the light pipe housing 1504 may be integrally formed with a larger housing such as a sensor housing, a lighting fixture housing, etc. without departing from the scope of this disclosure.

In some example embodiments, the light pipe assembly 1500 may be oriented differently than shown in FIG. 15 without departing from the scope of this disclosure. For example, considering the orientation of the light pipe assembly 1500 shown in FIG. 15 as a vertical orientation, the light pipe assembly 1500 may be rotated to a particular angle in a 360-degree rotation of the light pipe assembly 1500. For example, the light pipe assembly 1500 may be horizontally oriented or flipped 180 degrees.

Figure 16:
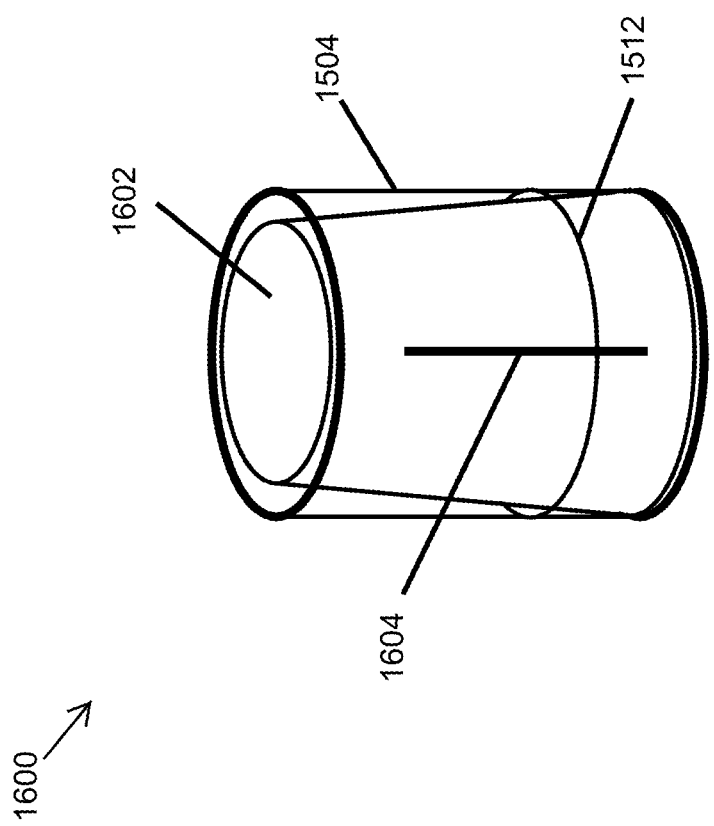
FIG. 16 illustrates a top perspective view of a light pipe assembly according to another example embodiment.

FIG. 16 illustrates a top perspective view of a light pipe assembly 1600 according to another example embodiment. Referring to FIGS. 15 and 16, in some example embodiments, the light pipe assembly 1600 may include a light pipe 1602 and the light pipe housing 1504. In contrast to the light pipe 1502 of FIG. 15, the light pipe 1602 may include longitudinal crush ribs, such as a longitudinal crush rib 1604, that do extend for less than the entire length of the light pipe 1602. In general, the light pipe 1602 may be made from the same material and in a similar manner as the light pipe 1502.

In some example embodiments, the light pipe 1602 may include three longitudinal crush ribs that correspond to the longitudinal crush ribs 1506-1510 of the light pipe 1502 of FIG. 15. Alternatively, the light pipe 1602 may include more or fewer than three longitudinal crush ribs. The longitudinal crush rib 1604 may be longer or shorter than shown without departing from the scope of this disclosure. The light pipe 1602 may be inserted in the cavity of the light pipe housing 1604 in a similar manner as described above with respect to the light pipe 1502. In general, the light pipe 1602 may be made from the same material and in a similar manner as the light pipe 1502.

Figure 17:
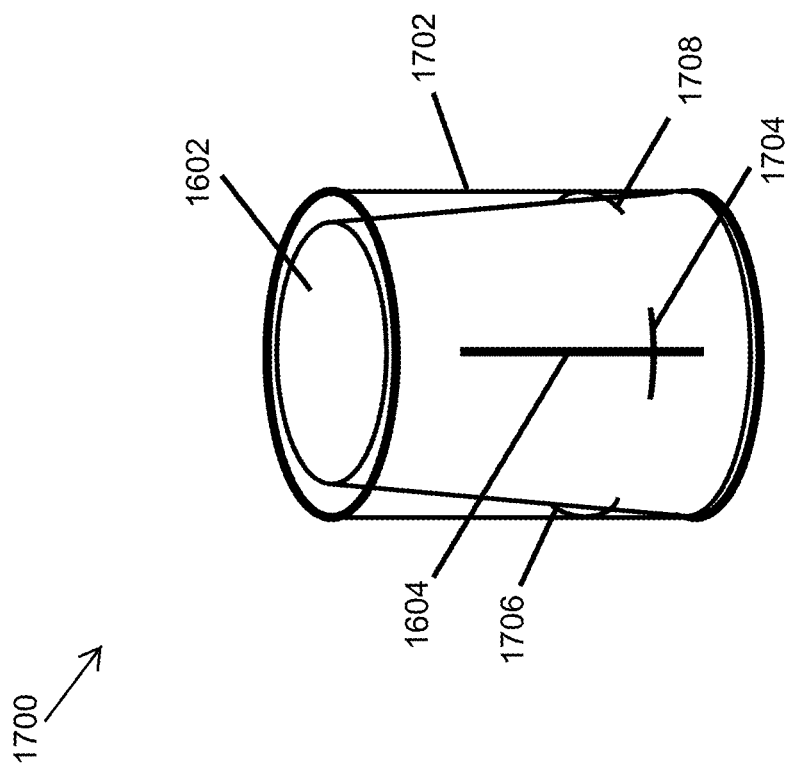
FIG. 17 illustrates a top perspective view of a light pipe assembly according to another example embodiment.

FIG. 17 illustrates a top perspective view of a light pipe assembly 1700 according to another example embodiment. Referring to FIGS. 15-17, in some example embodiments, the light pipe assembly 1700 may include the light pipe 1602 and a light pipe housing 1702. In contrast to the light pipe housing 1504 of FIG. 15, the light pipe housing 1702 may include a circumferential crush rib that includes multiple segments such as crush rib segments 1704, 1706, 1708. To illustrate, each crush rib segment 1704, 1706, 1708 extends out from the inner surface of the light pipe housing 1702 toward the cavity of the light pipe housing 1702. In general, the light pipe housing 1702 may be made from the same material and in a similar manner as the light pipe housing 1504.

In some example embodiments, the crush rib segments 1704-1708 can be used to retain the light pipe 1602 in the cavity of a light pipe housing 1702 in a similar manner as described with respect to the light pipe 1502 and the light pipe housing 1504 of FIG. 15. For example, the crush rib segments 1704-1708 may be located such that the top surface of the light pipe 1602 is flush with or below the top opening of the light pipe housing 1702 when the light pipe 1602 is retained in the light pipe housing 1702 by the crush rib segments 1704-1708 and the longitudinal crush ribs such as the longitudinal crush rib 1604. In some alternative embodiments, the light pipe 1502 shown in FIG. 15 or another light pipe may be used with the light pipe housing 1702.

In some alternative embodiments, the light pipe housing 1702 may include more or fewer crush rib segments than shown without departing from the scope of this disclosure. In some alternative embodiments, the crush rib segments 1704, 1706, 1708 may be shorter or longer than shown without departing from the scope of this disclosure. In some alternative embodiments, the crush rib segments 1704, 1706, 1708 may be bumps without departing from the scope of this disclosure. In some example embodiments, the light pipe housing 1702 may be integrally formed with a larger housing such as a sensor housing, a lighting fixture housing, etc. without departing from the scope of this disclosure.

Figure 18:
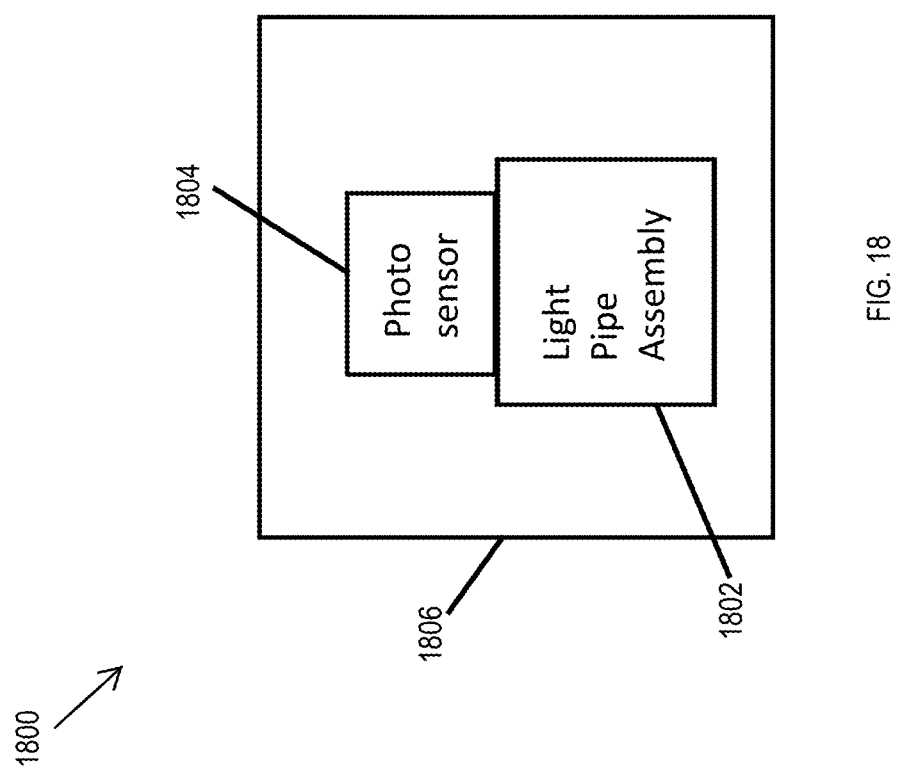
FIG. 18 illustrates a block diagram of a sensor device including a light pipe assembly according to an example embodiment.

FIG. 18 illustrates a block diagram of a sensor device 1800 including a light pipe assembly 1802 according to an example embodiment. For example, the light pipe assembly 1802 may correspond the light pipe assembly 100, 800, or another of the light pipe assembly. In some example embodiments, the sensor device 1800 may include a photosensor component/circuit 1804 that may be positioned at an end of the light pipe of the light pipe assembly 1802 to receive light that exits the light pipe of the light pipe assembly 1802. For example, considering the light pipe assembly 1802 as corresponding to the light pipe assembly 100 shown in FIG. 1 where the light pipe assembly 100 includes the light pipe 102 shown in FIGS. 1-2B, light that enters the wide surface 204 of the light pipe 102 may exit through the narrow surface 202 toward the photosensor component/circuit 1804. To illustrate, the photosensor component/circuit 1804 may be positioned at the narrow surface 202 of the light pipe 102. As another example, considering the light pipe assembly 1802 as corresponding to the light pipe assembly 1500 shown in FIG. 15, light that enters the bottom surface of the light pipe 1502 may exit through the narrow top surface of the light pipe 1502 toward the photosensor component/circuit 1804.

In some example embodiments, the photosensor component/circuit 1804 may generate one or more electrical signals based on the light received from the light pipe of the light pipe assembly 1802. For example, the photosensor component/circuit 1804 may output one or more electrical signals that indicates the intensity level of natural light in a room. Alternatively, the photosensor component/circuit 1804 may output one or more electrical signals that electrically represent the light that is received by the photosensor component/circuit 1804.

In some example embodiments, the light pipe assembly 1802 and the photosensor component/circuit 1804 may be in a sensor housing 1802. For example, the light pipe housing of the light pipe assembly 1802 may be integrally formed with the sensor housing 1806 and may include an opening such that light can reach the wide surface of the light pipe of the light pipe assembly 1802. In some example embodiments, the sensor device 1800 may include other components without departing from the scope of this disclosure.

Figure 19:
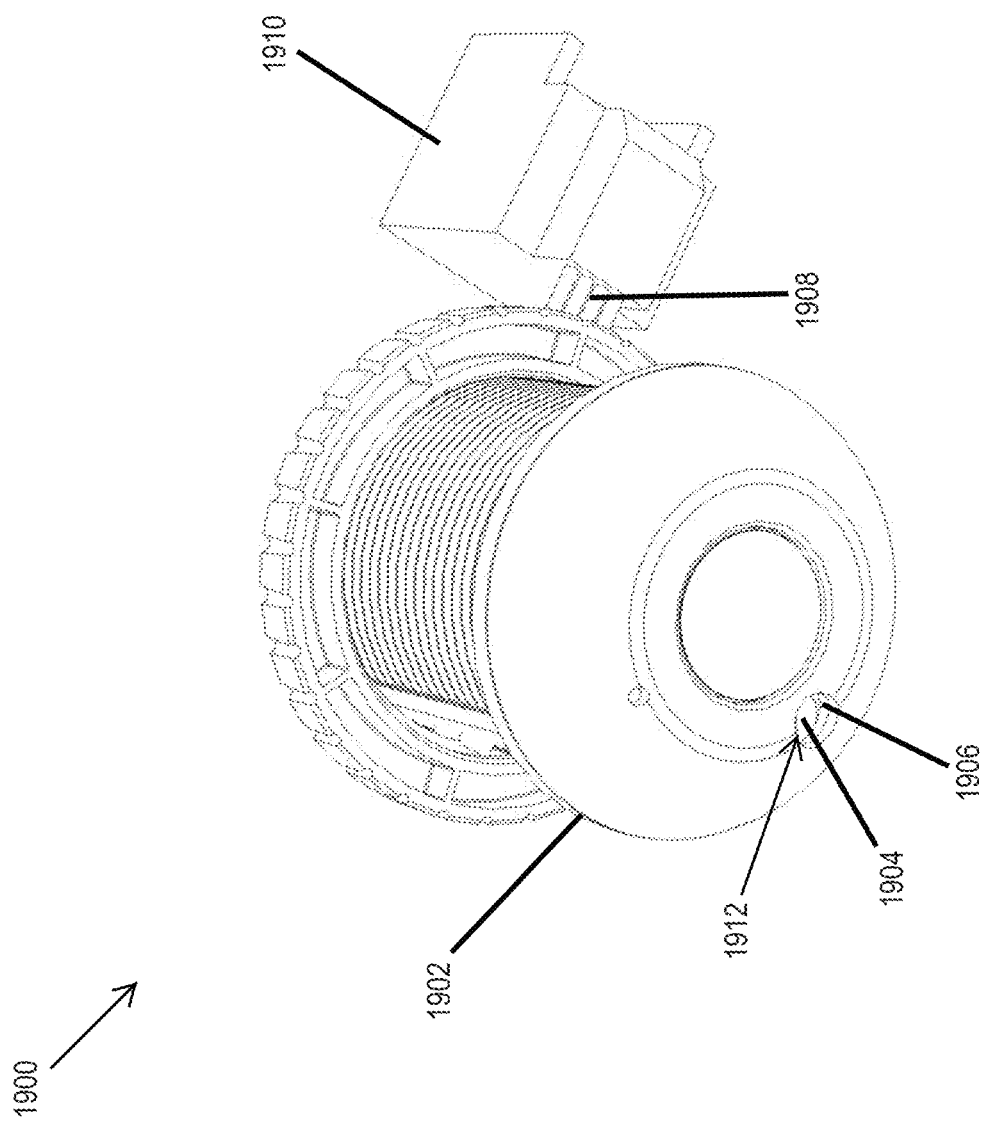
FIG. 19 illustrates a sensor device including a light pipe assembly according to an example embodiment.

FIG. 19 illustrates a sensor device 1900 including a light pipe assembly according to an example embodiment. In some example embodiments, the sensor device 1900 may include a sensor housing 1902. A light pipe 1904 may be positioned in a light pipe housing 1906 in a similar manner as described above with respect to light pipes (e.g., the light pipe 102, the light pipe 1502, etc.) as well as light pipe housings (e.g., the light pipe housing 104, the light pipe housing 1504, etc.).

In some example embodiments, an opening 1912 of the sensor housing 1902 may be aligned with the light pipe housing 1906 and the light pipe 1904 such that light can enter the light pipe 1904. The light that enters the light pipe 1904 may travel through the light pipe 1904 in a similar manner as described above, for example, with respect to the light pipe 102. In some example embodiments, the light pipe 1904 and the light pipe housing 1906 may together correspond to the light pipe assembly 100 described above. In some example embodiments, the light pipe 1904 and the light pipe housing 1906 along with a portion of the sensor housing 1902 may together correspond to the light pipe assembly 800 described above.

In some example embodiments, one or more electricals generated by a photosensor component/circuit that is inside the sensor housing 1902 may carried by one or more wires 1902 that are connected to a connector 1910. In some example embodiments, the sensor device 1900 corresponds to the sensor device 1800 of FIG. 18.

In some example embodiments, the sensor device 1900 may be installed in a ceiling as a standalone device. In some example embodiments, the sensor device 1900 may be attached to a lighting fixture housing. In some alternative embodiments, the sensor housing 1902 may have a different shape than shown in FIG. 19 without departing from the scope of this disclosure. In some alternative embodiments, the opening 1912 of the sensor housing 1902 as well as the light pipe 1904 and the light pipe housing 1906 may be at a different location than shown without departing from the scope of this disclosure.

Figure 20:
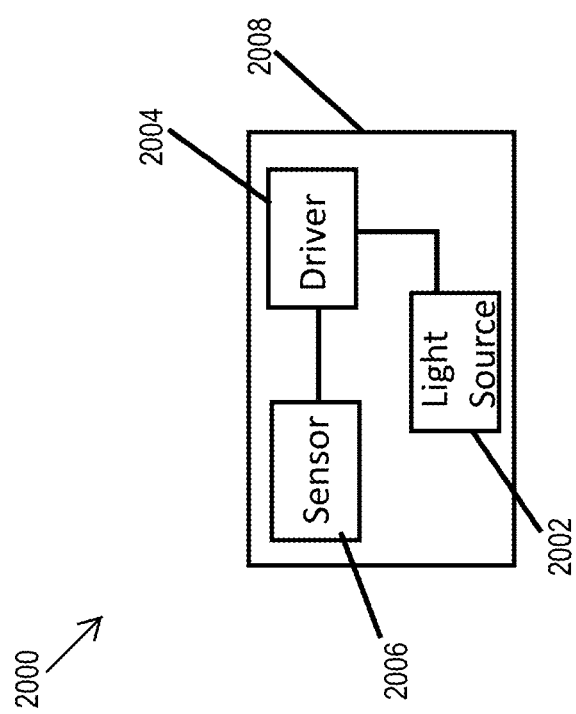
FIG. 20 illustrates a lighting fixture including a sensor device according to an example embodiment.

FIG. 20 illustrates a lighting fixture including a sensor device according to an example embodiment. In some example embodiments, the lighting fixture 2000 includes a light source 2002 (e.g., an LED light source), a driver 2004, and a sensor device 2006. For example, the light source 2002, the driver 2004, and the sensor device 2006 may each be at least partially in one or more cavities or compartments of a lighting fixture housing 2008 of the lighting fixture 2000.

In some example embodiments, the sensor device 2006 may correspond to the sensor component/circuit 1804 of FIG. 18 or the sensor device 1900 of FIG. 19. For example, the driver 2004 that provides power to the light source 2002 may control or adjust the power based on sensor information (e.g., light intensity level, etc.) from the sensor device 2006. The sensor device 2006 may be attached to the lighting fixture housing 2008 such that light can reach the light pipe of the sensor device 2006 such that the light can travel through the light pipe to reach a photosensor of the sensor device 2006.

In some example embodiments, the lighting fixture 2000 may include other components without departing from the scope of this disclosure. In some alternative embodiments, the driver 2004 may be fully outside of the lighting fixture housing 2008. Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:
1. A light pipe assembly, comprising:
   a light pipe having one or more first crush ribs extending outwardly from an outer surface of the light pipe, wherein the one or more first crush ribs comprise one or more longitudinal crush ribs; and a light pipe housing having one or more second crush ribs extending into a cavity of the light pipe housing, wherein the one or more second crush ribs comprise one or more circumferential crush ribs that extend annularly on an inner surface of the light pipe housing, wherein, when the light pipe is positioned in the cavity of the light pipe housing, the light pipe is retained in the light pipe housing by the one or more first crush ribs and the one or more second crush ribs, and wherein the one or more first crush ribs come in contact with and press against the one or more second crush ribs when the light pipe is positioned in the cavity of the light pipe housing.

2. The light pipe assembly of claim 1, wherein the light pipe is truncated cone shaped.

3. The light pipe assembly of claim 1, wherein the light pipe includes a narrow surface at a first end of the light pipe and a wide surface at a second end of the light pipe and wherein the narrow surface is narrower than the wide surface.

4. The light pipe assembly of claim 3, wherein the narrow surface and the wide surface each have a polygonal shape.

5. The light pipe assembly of claim 1, wherein the one or more first crush ribs comprise at least three longitudinal crush ribs.

6. The light pipe assembly of claim 1, wherein the one or more first crush ribs each comprise multiple crush rib segments.

7. The light pipe assembly of claim 1, wherein the one or more first crush ribs extend from a narrow end of the light pipe to a wide end of the light pipe.

8. The light pipe assembly of claim 1, wherein the light pipe is in direct contact with the light pipe housing at the one or more first crush ribs.

9. A light sensor device, comprising:
a photosensor circuit; and
a light pipe assembly, comprising:
a light pipe having one or more first crush ribs extending outwardly from an outer surface of the light pipe, wherein the one or more first crush ribs comprise one or more longitudinal crush ribs; and
a light pipe housing having one or more second crush ribs, wherein the one or more second crush ribs comprise one or more circumferential crush ribs that extend annularly on an inner surface of the light pipe housing, wherein the light pipe is positioned in a cavity of the light pipe housing such that the one or more first crush ribs are in contact with and press against the one or more second crush ribs, and wherein a narrow surface of the light pipe is proximal to the photosensor circuit such that a light that exits the light pipe through the narrow surface is directed toward the photosensor circuit.

10. The light sensor device of claim 9, wherein the light pipe is truncated cone shaped.

11. The light sensor device of claim 9, wherein the narrow surface of the light pipe is at a first end of the light pipe, wherein a wide surface of the light pipe at a second end of the light pipe, and wherein the narrow surface is narrower than the wide surface.

12. The light sensor device of claim 11, wherein the narrow surface and the wide surface each have a polygonal shape.

13. The light sensor device of claim 9, wherein the one or more first crush ribs comprise at least three longitudinal crush ribs.

14. The light sensor device of claim 9, wherein the one or more circumferential crush ribs each include multiple crush rib segments.

15. The light sensor device of claim 9, wherein the one or more first crush ribs extend from a narrow end of the light pipe to a wide end of the light pipe.

16. A lighting fixture, comprising:
a light source to provide an illumination light; and
a light sensor device comprising a photosensor circuit and
a light pipe assembly, wherein the light source is controlled based on a light detection by the light sensor device and wherein the light pipe assembly comprises:
a light pipe having one or more first crush ribs extending outwardly from an outer surface of the light pipe; and
a light pipe housing having one or more second crush ribs, wherein the light pipe is positioned in a cavity of the light pipe housing such that the one or more first crush ribs are in contact with and press against the one or more second crush ribs and wherein a narrow surface of the light pipe is proximal to the photosensor circuit such that a light that exits the light pipe through the narrow surface is directed toward the photosensor circuit.

17. The lighting fixture of claim 16, wherein the one or more first crush ribs comprise one or more circumferential crush ribs that extend annularly at the outer surface of the light pipe and wherein the one or more second crush ribs comprise one or more longitudinal crush ribs that intersect the one or more first crush ribs.

18. The lighting fixture of claim 16, wherein the light pipe is truncated cone shaped.

19. The lighting fixture of claim 16, wherein the one or more first crush ribs extend from a narrow end of the light pipe to a wide end of the light pipe.

* * * * *